Aug. 28, 1951 W. E. WITHALL 2,565,671
FRICTION SHOCK ABSORBER FOR RAILWAY CAR TRUCKS
Filed Oct. 3, 1949
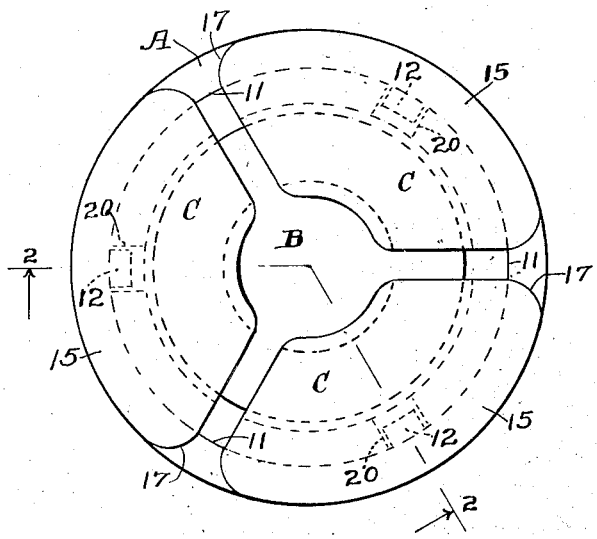
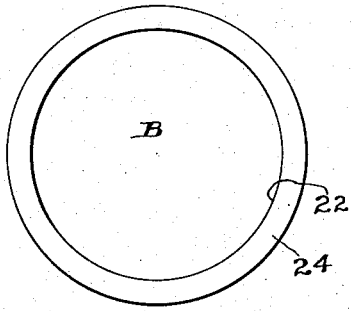
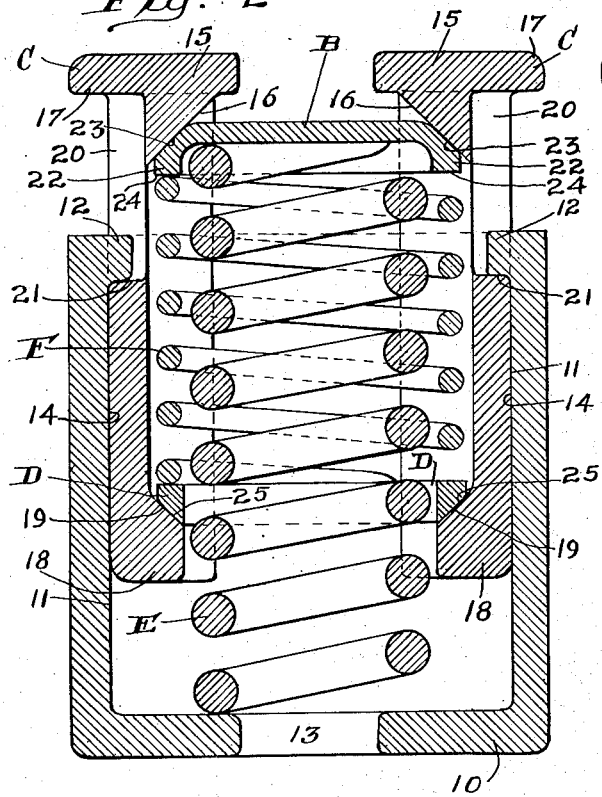
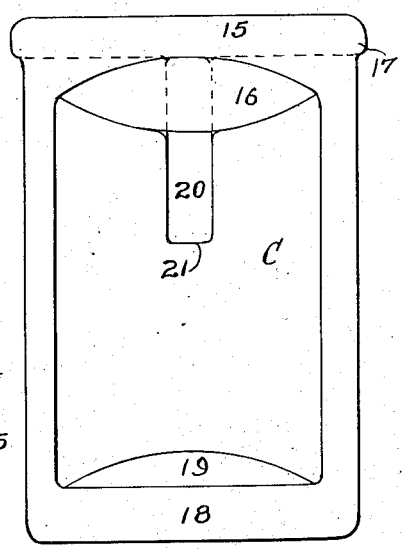
Inventor:
William E. Withall.
By
Henry Fuchs.
Atty.

Patented Aug. 28, 1951

2,565,671

UNITED STATES PATENT OFFICE 2,565,671

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application October 3, 1949, Serial No. 119,258

6 Claims. (Cl. 267—9)

This invention relates to improvements in friction shock absorbers for snubbing or dampening the action of railway car truck springs.

One object of the invention is to provide a friction shock absorber for snubbing the action of railway car truck springs, comprising a friction casing, friction shoes slidingly telescoped within the casing, a combined wedge and spring follower in wedging engagement with the shoes to spread the same apart, and a spring within the casing opposing inward movement of the combined wedge and spring follower, wherein means is provided for preventing inward tilting of the shoes during operation of the mechanism.

A further object of the invention is to provide a mechanism of the character indicated, comprising a friction casing, and friction shoes slidingly telescoped within the casing, wherein the shoes are pressed into intimate contact with the interior walls of the casing by spring actuated wedge means having wedging engagement with opposite ends of the shoes.

A more specific object of the invention is to provide a mechanism as set forth in the preceding paragraph, wherein the spring actuated wedge means comprises a combined wedge and spring follower, having wedging engagement with the interior wedge faces at the outer ends of the shoes, a wedge member having wedging engagement with the interior wedge faces at the inner ends of the shoes, a spring reacting between the casing and combined wedge and spring follower, opposing movement of the latter inwardly of the casing and pressing the same against the wedge faces at the outer ends of the shoes, and a second spring reacting between said combined wedge and spring follower and the wedge member for augmenting the pressure exerted by said first spring on said combined wedge and spring follower and pressing the wedge member against the wedge faces at the inner ends of the shoes.

Other objects of the invention will more clearly appear from the description and claims hereinafter following.

In the accompanying drawing forming a part of this specification, Figure 1 is a top plan view of my improved shock absorber. Figure 2 is a transverse, vertical sectional view, on two intersecting planes, at an angle of 120 degrees with respect to each other, corresponding substantially to the line 2—2 of Figure 1, the rear shoe being omitted. Figure 3 is a bottom plan view of the combined wedge and spring follower employed in my improved mechanism. Figure 4 is an inside elevational view of the rear friction shoe shown in Figure 1.

As shown in the drawing, my improved shock absorber comprises broadly a friction casing A, a combined wedge and spring follower B, three friction shoes C—C—C, a wedge ring D, an inner spring E, and an outer spring F.

The casing A is in the form of a tubular member of cylindrical, transverse cross section, open at its top end, and having a transverse wall 10 at its bottom end. The casing A presents lengthwise extending, transversely curved, interior friction surfaces 11—11—11 with which the three shoes C—C—C respectively cooperate. At the upper end thereof, the casing A has three circumferentially spaced, inwardly projecting stop lugs 12—12—12, each lug being located centrally of the corresponding friction surface 11. The bottom wall 10 of the casing is provided with a central opening 13 adapted to accommodate the usual spring centering lug of the lower spring plate of a truck spring cluster.

The three friction shoes C—C—C are of similar design and are arranged symmetrically about the central vertical axis of the mechanism. Each shoe is of curved, transverse cross section, presenting a longitudinally extending, transversely curved, friction surface 14 on the outer side, slidingly engaged with the corresponding friction surface 11 of the casing. Each shoe also has an inwardly projecting, relatively heavy, horizontal flange 15 at the upper end, provided with a downwardly facing wedge face 16 on its underneath side. Each shoe further has a laterally outwardly projecting flange 17 at its upper end, which overhangs the wall of the casing A, and is engageable with the upper end of said wall to limit downward movement of the shoe. At its lower end, each shoe has a laterally inwardly projecting flange 18 on its inner side, provided with an upwardly facing wedge face 19 on its upper side. Each shoe C is centrally slotted lengthwise, as indicated at 20, to accommodate the corresponding lug 12 of the casing, said slot extending downwardly from the flange 17 of the shoe, short of midway between the ends of the shoe, thereby providing a horizontal stop shoulder 21, engageable with the lug 12 to limit outward movement of said shoe.

The combined wedge and spring follower B is in the form of a heavy disc, having a downturned, peripheral flange 22. The combined wedge and spring follower B has an upwardly facing, annular wedge face 23 in wedging engagement with the wedge faces 16—16—16 of the shoes C—C—C. The lower end of the flange 22 presents a horizontal abutment face 24 for the upper end of the spring F.

The wedge ring D is seated on the flanges 18—18—18 of the three shoes C—C—C and has an annular wedge face 25 on its underneath side engaging the wedge faces 19—19—19 of said shoes.

The inner spring E is in the form of a helical coil extending through the wedge ring D and having its top and bottom ends bearing, respectively, on the underneath side of the combined wedge and spring follower B and the bottom wall 10 of the casing A.

The outer spring F is also in the form of a helical coil, but is lighter than the spring E. The spring F surrounds the spring E and has its top and bottom ends bearing, respectively, on the abutment face 24 of the combined wedge and spring follower B and the upper side of the wedge ring D. The springs E and F are both under initial compression, thereby wedging the shoes apart into tight frictional engagement with the friction surfaces of the casing A, the spring F, through the agency of the wedge ring D, spreading the lower ends of the shoes apart, thus overcoming any tendency for the lower ends of the shoes to tilt inwardly, which would otherwise occur if the combined wedge and spring follower B alone were employed to spread the shoes apart.

In assembling the mechanism, the spring E is first placed within the casing A, while the latter is in upright position, stood on its base. The friction shoes C—C—C—, combined wedge and spring follower B, wedge ring D, and spring F, assembled as a unit, are then placed within the casing telescoping the shoes within the open end of said casing, while said assembled unit is held contracted to an extent to permit the same to pass between the stop lugs 12—12—12 of the casing, the slots 20—20—20 of the shoes being aligned with the lugs 12—12—12. The shoes are forcibly depressed until the shoulders 21—21—21 at the lower ends of the slots 20—20—20 pass beneath the lugs 12—12—12, thus permitting the shoe structure to expand and thereby allowing the lugs to enter the slots 20—20—20, in overhanging relation to the shoulders 21—21—21.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes are forced downwardly with respect to the casing A, against the spring resisted combined wedge and spring follower B. The shoes are thus wedged apart by the action of the spring E on the combined wedge and spring follower B, and the pressure of the spring F on the combined wedge and spring follower B and the wedge ring D, and forced into tight frictional engagement with the friction surfaces of the casing A, thereby providing high frictional resistance to snub the action of the truck springs. Upon recoil of the truck springs and upward movement of the top spring plate of the truck spring cluster, the spring E returns all of the parts to the normal full release position, outward movement of the shoes being limited by engagement of the stop shoulders thereof with the stop lugs of the casing.

I claim:

1. In a friction shock absorber, the combination with a friction casing open at one end and closed at the other end by a transverse wall; of a plurality of elongated friction shoes slidingly telescoped within the casing, each of said shoes having an inwardly facing wedge face at its outer end and an outwardly facing wedge face at its inner end; a wedge engaging the wedge faces at the outer ends of said shoes; a second wedge engaging the wedge faces at the inner ends of said shoes; spring means reacting between said first and second named wedges; and a second spring means reacting between said first named wedge and said wall of the casing.

2. In a friction shock absorber, the combination with a friction casing open at one end and closed at the other end by a transverse wall; of a plurality of elongated friction shoes slidingly telescoped within the casing, each of said shoes having wedge faces at opposite ends thereof; a wedge engaging the wedge faces at one set of ends of said shoes; a wedge ring engaging the wedge faces at the opposite set of ends of said shoes; spring means reacting between said wedge and wedge ring; and a second spring means extending through said wedge ring and reacting between said first named wedge and said wall of the casing.

3. In a friction shock absorber, the combination with a friction casing open at one end and closed at the other end by a transverse wall; of a plurality of elongated friction shoes slidingly telescoped within the casing, each of said shoes having wedge faces on its inner side at opposite ends thereof; a wedge engaging the wedge faces at one set of ends of said shoes; a wedge ring engaging the wedge faces at the opposite set of ends of said shoes; a spring having its opposite ends bearing on said wedge and wedge ring; and a second spring extending through said wedge ring and bearing at opposite ends on said wedge and casing wall.

4. In a friction shock absorber, the combination with a friction casing open at one end and closed at the other end by a transverse wall; of a plurality of elongated friction shoes slidingly telescoped within said open end of the casing; an inturned flange at the outer end of each shoe; a wedge face on the inner side of said flange of each shoe; an inturned flange at the inner end of each shoe; a wedge face on the inner side of said inner flange; a combined wedge and spring follower in wedging engagement with the wedge faces at the outer ends of said shoes; a wedge ring in wedging engagement with the wedge faces at the inner ends of said shoes; a spring having its opposite ends bearing on said wall of the casing and said combined wedge and spring follower; and a second spring surrounding said first named spring and bearing at opposite ends on said wedge ring and combined wedge and spring follower.

5. In a friction shock absorber, the combination with a friction casing open at its upper end and having a transverse wall at its bottom end; of a plurality of friction shoes arranged symmetrically about the longitudinal central axis of the mechanism in sliding engagement with the interior of the casing, said shoes having interior wedge faces at the top and bottom ends thereof; a spring follower having wedge faces in wedging engagement with the wedge faces at the top ends of said shoes; a wedge ring in wedging engagement with the wedge faces at the bottom ends of said shoes; a spring reacting between said spring follower and wedge ring; and a second spring reacting between the bottom wall of said casing and said spring follower.

6. In a friction shock absorber, the combination with a friction casing open at its upper end and having a transverse wall at its bottom end; of a set of three friction shoes arranged symmetrically about the longitudinal central axis of the mechanism in sliding engagement with the interior of the casing, said shoes having interior wedge faces at the top and bottom ends thereof; a spring follower having wedge faces in wedging engagement with the wedge faces at the top ends of said shoes; a wedge member in wedging engagement with the wedge faces at the bottom ends of said shoes, said wedge member having a central opening therethrough; a spring reacting between said spring follower and wedge member; and a second spring extending through the opening of said wedge member and reacting between the bottom wall of said casing and said spring follower.

WILLIAM E. WITHALL.

REFERENCES CITED

The following references are of record in the file of this patent:

UNITED STATES PATENTS

| Number | Name | Date |
|---|---|---|
| 1,853,932 | Schmidt | Apr. 12, 1932 |
| 2,238,083 | Sproul | Apr. 15, 1941 |
| 2,496,254 | Schlegel | Jan. 13, 1950 |